April 13, 1926.

A. MOORHOUSE

MOTOR VEHICLE

Filed July 1, 1922

Inventor
Alfred Moorhouse
By Miller Tibbetts
Attorney

April 13, 1926.  1,580,315
A. MOORHOUSE
MOTOR VEHICLE
Filed July 1, 1922    2 Sheets-Sheet 2
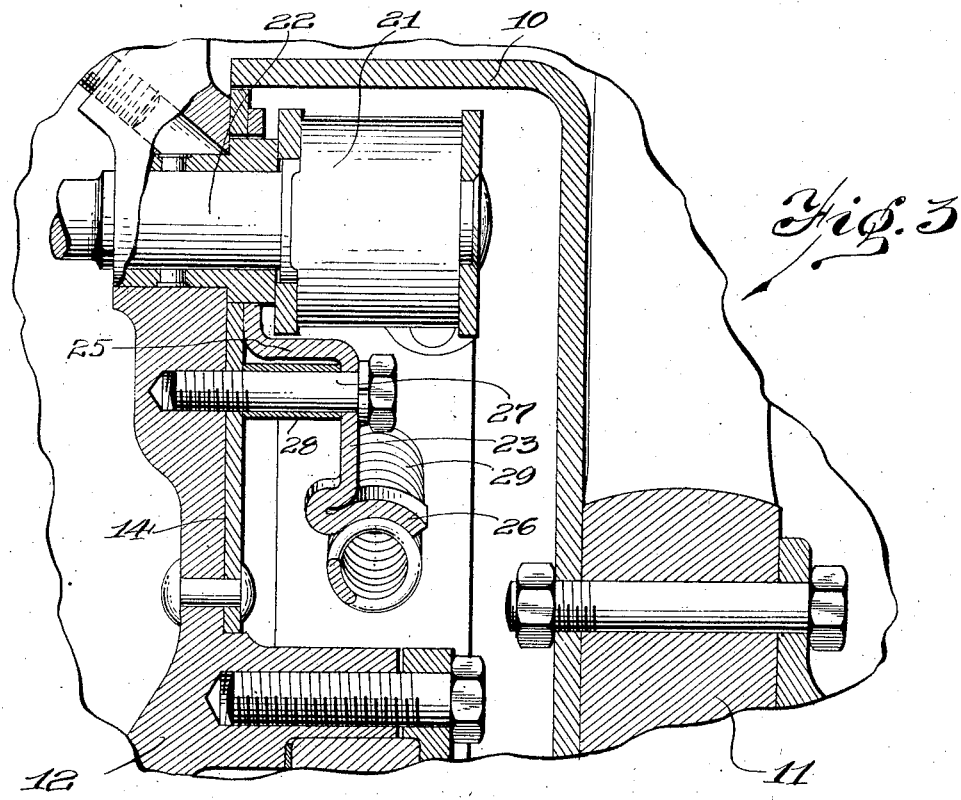
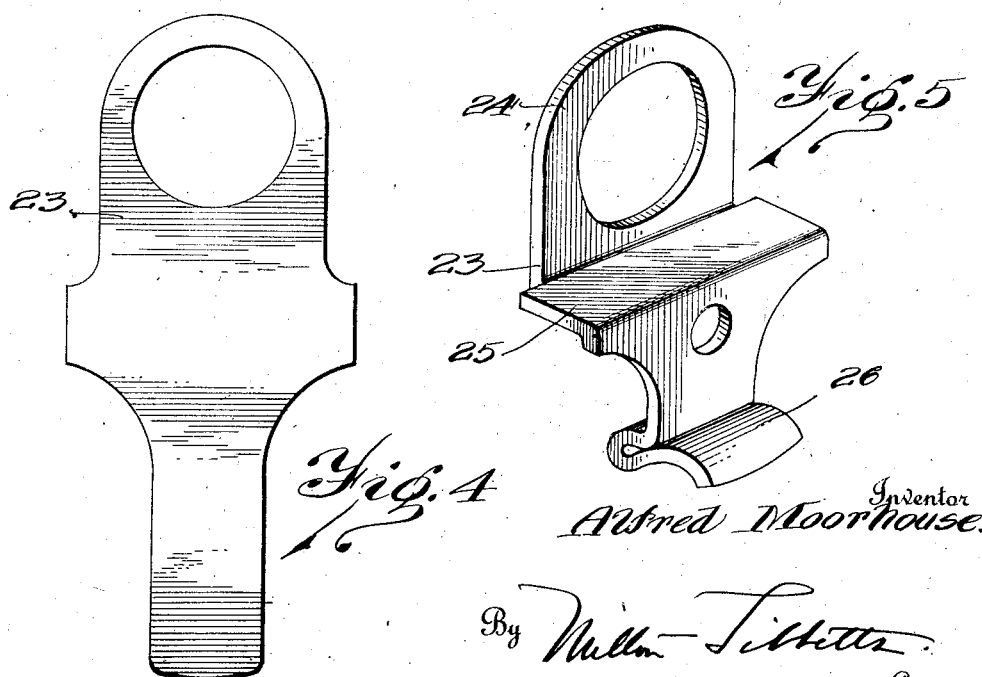
Alfred Moorhouse, Inventor
By Milton Tibbetts, Attorney Patented Apr. 13, 1926.

1,580,315

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed July 1, 1922. Serial No. 572,188.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

This invention relates to motor vehicles and particularly to brake mechanism.

One of the objects of the present invention is to provide a brake mechanism of simple and strong construction and one in which the shoes in retracted position will be held away from the brake drum.

Another object of the invention is to provide a brake mechanism in which a single spring may be employed for retracting the brake band both against the operating cam and away from the brake drum.

Other objects of the invention will appear from the following description taken in connection with the drawings, which form a part of this specification, and in which:

Fig. 3 is an enlarged sectional view substantially on the line 3—3 of Fig. 2;

Fig. 4 is a plan view of a blank stamping which is used for a bracket of this mechanism; and Fig. 5 is a perspective view of the complete bracket made from the blank shown in Fig. 4.

Figure 2:
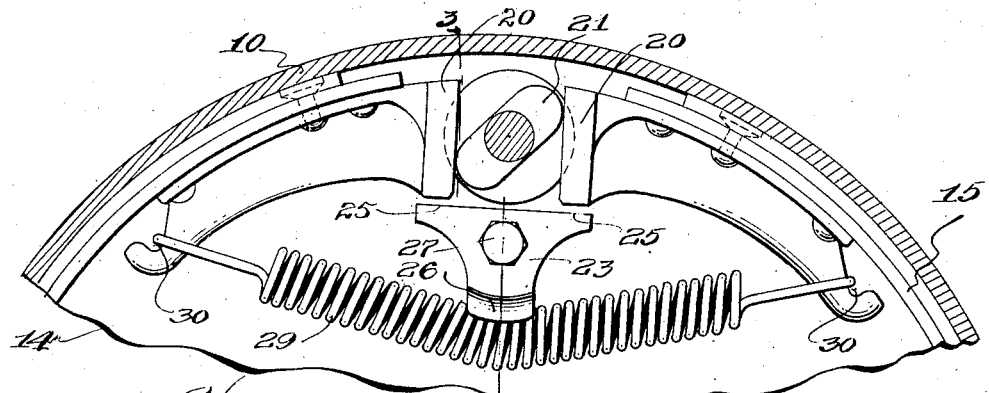
Fig. 2 is a slightly enlarged view of a part of the mechanism shown in Fig. 1, the brake band being in its expanded or operative position.

Referring to the drawings 10 represents a brake drum which, as shown in Fig. 3, is mounted on a wheel 11 which may be one of the wheels of a motor vehicle. An axle is shown at 12 in Figs. 1 and 3 and a driving shaft 13 is shown as mounted in the axle. A plate 14 is riveted to the stationary part of the axle as shown particularly in Fig. 3 and this plate forms a support for the brake mechanism.

Figure 1:
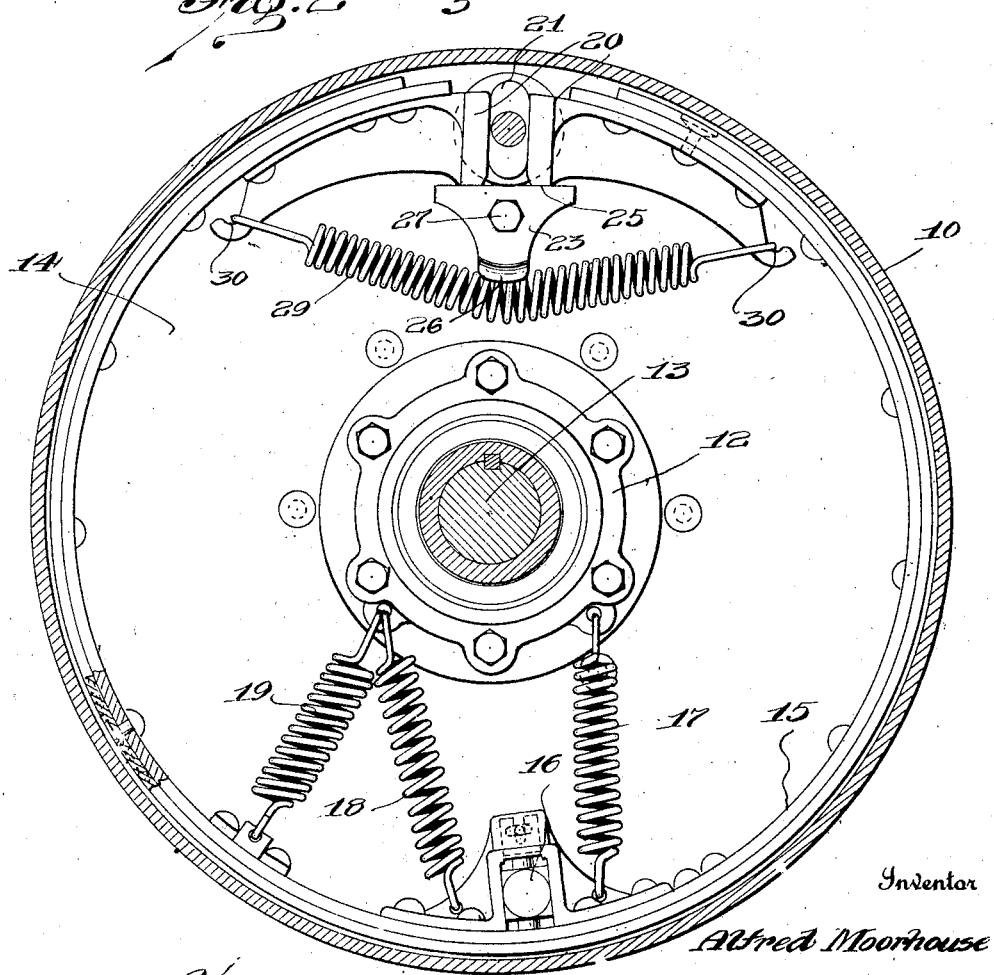
Fig. 1 is a sectional view through the axle of an automobile showing a brake mechanism made in accordance with this invention.

The brake part of the invention may be in one or more sections but in the form shown it comprises a brake band 15 which is supported on a pin 16 mounted on the plate 14. The band may slide radially relative to the pin 16 so that it may be expanded against the brake drum 10, and three springs 17, 18 and 19 are shown for yieldingly retaining that part of the brake band in the retracted position in which it is shown in Fig. 1.

The brake band 15 is in the form of a split ring and its adjacent ends 20 are adapted to be separated by the operation of a cam 21 mounted on the pivot 22. This cam is adapted to be connected with any suitable rods to be moved by the operator.

Heretofore in brakes of this general character a spring connecting the adjacent ends of the brake band has been depended upon to keep the brake band in contact with the cam and away from the brake drum. It has been found, however, that such construction frequently permits one of the ends of the band to drag against the brake drum and undue wear consequently takes place.

In the present invention a bracket is provided to form stops against which the ends of the brake band may rest. This bracket may be stamped from a piece of sheet metal and may be made up as shown in Figs. 4 and 5. The bracket is indicated at 23 and after being stamped out as shown in Fig. 4 it is bent to the form shown in Fig. 5. Thus it has a ring portion 24 which surrounds the pivot 22 of the cam 21. A part 25 is bent at right angles to the ring portion 24 and forms a stop for the ends of the brake band as shown particularly in Figs. 1 and 5. Another portion of the bracket 23 extends radially inward from the cam 21 and is bent in the form of a shoulder or seat 26 for a spring which will be hereinafter described. The bracket 23 is connected to the support 14 by a bolt 27 and the cam 21 assists in retaining it in place. A collar 28 surrounds the bolt 27 to properly space the bracket from the support.

A coil spring 29 is provided for yieldingly drawing the ends of the brake band 15 against the cam 21 and against the stop 25. The ends of the spring 29 are secured to the brake band as at 30 and the spring is bent somewhat so that its middle portion rests on the shoulder or seat 26 of the bracket 23, as shown particularly in Figs. 1, 2 and 3.

From the above description it will be seen that the springs 17, 18, 19 and 29 will yieldingly retain the brake band 15 in its retracted or inoperative position with all parts of the band held away from the brake drum 10 and with the ends 20 of the brake band against the cam 21 and in contact with the stop 25 of the bracket 23. By the action of the bent coil spring 29 the ends of the brake band are both brought together and against the stop 25 so that there can be no brake drag.

When the cam 21 is operated as shown in Fig. 2 the ends of the brake band are separated and the band is expanded against the brake drum 10.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a brake mechanism, the combination with a brake drum and a brake band having adjacent ends, means between the ends of the band for operating them, a retracting spring for the band, and a stop to limit the inward radial movement of the band ends and forming a seat for said spring.

2. In a brake mechanism, the combination with a brake drum and brake shoe cooperating therewith, of means for separating the adjacent ends of the brake shoe, a stop to limit the inward radial movement of the ends of the brake shoe, and a spring connecting the ends of the brake shoe and positioned to bring the ends of the shoe into contact with said stop.

3. A brake mechanism comprising a split brake band, means for separating the ends of the brake band, a bracket forming a stop against which said ends may rest when the brake is inactive, a retracting spring having its ends connected to the brake band and its middle portion in contact with said bracket so that the spring is bent slightly to thereby bring the ends of the brake band against said bracket.

4. A brake mechanism comprising a support, a brake band mounted thereon, a bracket secured to the support and forming a stop for the ends of the brake band, and spring means adapted to retract the said ends of the brake band toward each other and toward the stop, said spring means being bent about a portion of said stop.

5. A brake mechanism comprising a support, a brake band mounted thereon, a bracket secured to the support and forming a stop for the ends of said brake band, said bracket having a shoulder, and a spring connecting the ends of said brake band and being bent over said shoulder.

In testimony whereof I affix my signature.

ALFRED MOORHOUSE.